(12) United States Patent
Phillips et al.

(10) Patent No.: US 7,874,406 B2
(45) Date of Patent: Jan. 25, 2011

(54) THERMAL SIMULATION FRICTION DEVICE COOLING CONTROL

(75) Inventors: Andrew W. Phillips, Saline, MI (US); Donald L. Dusenberry, Farmington Hills, MI (US); James M. Hart, Belleville, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 10/650,208

(22) Filed: Aug. 28, 2003

(65) Prior Publication Data
US 2005/0045437 A1   Mar. 3, 2005

(51) Int. Cl.
*F16D 65/853* (2006.01)

(52) U.S. Cl. ............... 188/264 D; 192/70.12

(58) Field of Classification Search .......... 192/82 T, 192/70.12, 113.35, 113.1, 113.3, 113.34, 192/85 R; 74/467, DIG. 1; 188/71.6, 274, 188/264 R, 264 P, 264 B, 264 D; 477/154, 477/755, 98, 76; 701/36, 66; 303/191
See application file for complete search history.

(56) References Cited

U.S. PATENT DOCUMENTS

| | | | |
|---|---|---|---|
| 4,275,617 A | 6/1981 | Kalns | |
| 4,751,858 A | 6/1988 | Iwatsuki | |
| 5,216,606 A * | 6/1993 | Lentz et al. | 701/66 |
| 5,224,578 A | 7/1993 | Rheinheimer et al. | |
| 5,319,963 A * | 6/1994 | Benford | 73/115.02 |
| 5,347,886 A | 9/1994 | Mainquist et al. | |
| 5,518,098 A | 5/1996 | Zanetel et al. | |
| 5,613,588 A | 3/1997 | Vu | |
| 5,950,789 A * | 9/1999 | Hosseini et al. | 192/85 R |
| 6,095,946 A | 8/2000 | Maguire et al. | |
| 6,179,096 B1 * | 1/2001 | Kinerson et al. | 188/154 |
| 6,244,407 B1 | 6/2001 | Kremer et al. | |
| 6,308,812 B1 | 10/2001 | Eike et al. | |
| 6,446,774 B2 * | 9/2002 | Porter | 192/35 |
| 6,547,695 B2 * | 4/2003 | Yamashita et al. | 477/98 |
| 6,591,174 B2 * | 7/2003 | Chung et al. | 701/36 |
| 6,715,597 B1 * | 4/2004 | Buchanan et al. | 192/70.12 |
| 7,651,441 B2 * | 1/2010 | Maguire et al. | 477/181 |

* cited by examiner

*Primary Examiner*—Xuan Lan Nguyen

(57) ABSTRACT

A cooling system for cooling a friction device includes a flow control device which controls a flow of fluid through the friction device. A controller estimates a temperature state of the friction device and calculates a flow command based on the temperature state. The controller operates the flow control device based on the flow command. The temperature state is one of a temperature of the friction device and a thermal energy of the friction device.

18 Claims, 1 Drawing Sheet

THERMAL SIMULATION FRICTION DEVICE COOLING CONTROL

FIELD OF THE INVENTION

The present invention relates to vehicle friction devices, and more particularly to friction device cooling control.

BACKGROUND OF THE INVENTION

Vehicles include a power source, such as an internal combustion engine, that drives wheels through a transmission. The transmission is actuable to select one of a variety of gear ratios through which the wheels are driven. In the case of a manual transmission, the transmission is manually manipulated by the vehicle operator to achieve the desired gear ratio. In the case of an automatic transmission, the transmission is electronically controlled by a controller to achieve the desired gear ratios.

Implementation of either a manual transmission or an automatic transmission involves the use of friction devices. These friction devices include single-plate clutches, multi-plate clutches, cone clutches and band brakes. The friction devices enable selective interconnection of two rotating members. In general, friction devices include separate friction surfaces that selectively engage and disengage to form a link between the two rotating members.

In the case of a manual transmission, a manually operated friction device (i.e., clutch) is positioned between the power source and the transmission. The friction device enables smooth and progressive engagement between the power source and transmission for taking up initial drive and rapid disengagement for gear selection. In the case of an automatic transmission, a series of friction devices (e.g. single-plate clutches, multi-plate clutches, cone clutches and band brakes) are incorporated to enable gear selection. Other friction devices may be included such as an output clutch.

Heat is generated within the friction devices as a result of the progressive engagement of the friction surfaces. High temperatures and excessive heat generation adversely effect the friction device components. Traditional heat dissipation or cooling schemes are limited in effect. For example, one scheme limits friction device cooling to a predetermined time after engagement. That is to say, cooling fluid flows through the friction device for a predetermined time after actuation. Such cooling control is inadequate as it is independent of the actual heat generated within the friction device or the temperatures experienced by the friction device components.

SUMMARY OF THE INVENTION

Accordingly, the present invention provides a cooling system for cooling a friction device. The cooling system includes a flow control device that controls a flow of fluid through the friction device. A controller estimates a temperature state of the friction device and calculates a flow command based on the temperature state. The controller operates the flow control device based on the flow command.

In one feature, the controller determines a heat rate of the friction device and bases the temperature state on the heat rate.

In another feature, the controller determines a friction device torque and a friction device slip speed. The controller calculates the heat rate of the friction device based on the friction device torque and the friction device slip speed signal.

In another feature, the cooling system further includes a sump for collecting the flow of fluid and a sump temperature sensor that generates a sump temperature signal. The temperature state is further based on the sump temperature signal.

In another feature, the temperature state is further based on a current flow command.

In another feature, the flow command is further based on a heat rate of the friction device and a sump temperature of the flow of fluid.

In still another feature, the flow control device includes one of a fixed displacement pump, a variable displacement pump, an on/off valve and a variable opening valve.

In yet another feature, the temperature state is one of a temperature of the friction device and a thermal energy of the friction device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
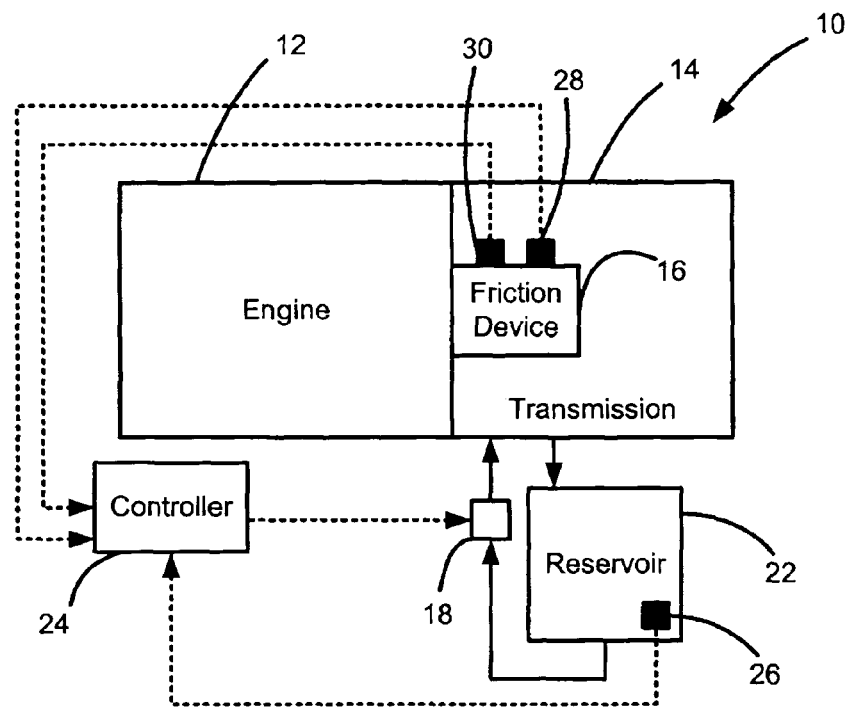
FIG. 1 is a functional block diagram of a vehicle drive line including a friction device cooling controller according to the present invention.

The following description of the preferred embodiments is merely exemplary in nature and is in no way intended to limit the invention, its application, or uses. For purposes of clarity, the same reference numbers will be used in the drawings to identify similar elements.

Referring now to FIG. 1, a vehicle drive line 10 is shown. The vehicle drive line 10 includes an engine 12 that drives a transmission 14 through a friction device 16. The friction device 16 can include a single-plate clutch, multi-plate clutch, cone clutch, band brake and the like and is generally electrohydraulically controlled. The friction device is typically disposed downstream of the power source (i.e., engine 12). The transmission 14 is one of either a manual transmission or an automatic transmission. In the case of a manual transmission, the friction device 16 selectively couples the transmission 14 to the engine 12. In the case of an automatic transmission, the friction device 16 represents one of several friction devices implemented to enable shifting between gear ratios. Additionally, the friction device 16 can represent stand-alone input or output clutches used to launch the vehicle 10 or a torque converter clutch. The engine 12 produces driving power that flows through the engaged friction device 16 and the gear reduction of the transmission 14 to drive wheels (not shown).

Fluid flows through the friction device 16 to cool the friction device 16 and maintain the integrity of its components (not shown). A flow control device 18 controls fluid flow through the friction device 16. The flow control device 18 can be any type of device that can control the flow rate of fluid into the friction device 16.

An exemplary flow control device 18 is a pump that is electrically or mechanically driven and has a fixed or variable displacement. The pump can be a simple on/off pump or variable speed pump. The flow rate of the fluid is controlled by the operating mode of the pump. For example, a simple fixed displacement, on/off pump does not pump fluid into the friction device 16 when the pump is off. If the pump is on, a fixed rate of fluid flows into the friction device 16. In the case of a variable displacement pump, the fluid flow rate can be controlled by the pump rate (e.g., 0% to 100%).

An alternative exemplary flow control device 18 includes a valve that controls the flow of pressurized fluid. The fluid flows into the friction device 16 through the valve. The valve can be one of various types of valves known in the art. For example, the valve can be a simple on/off valve that either allows or prohibits fluid flow therethrough. The valve can be a variable flow valve that operates at varying levels to vary the flow rate of fluid therethrough.

A reservoir or sump 22 retains a supply of the fluid. The flow control device 18 is supplied with fluid from the sump 22 and forwards the fluid through to the friction device 16. The fluid drains back into the sump 22 from the friction device 16 to be circulated back through the friction device 16.

A controller 24 controls operation of the flow control device 18 based on the friction device cooling control of the present invention. The controller 24 communicates with the flow control device 18. A sump temperature sensor 26 generates a sump temperature signal that is sent to the controller 24. The sump temperature signal indicates the temperature of the fluid.

As discussed in further detail below, the controller 24 determines both a friction device torque and a friction device slip speed. The controller 24 can estimate the friction device torque based on a commanded pressure signal to the friction device 16 or based on a change in the rotational speeds of the two members (not shown) selectively interconnected by the friction device 16. Alternatively, however, it is anticipated that a friction device torque sensor 28 generates a friction device torque signal. The friction device torque sensor 28 can include a deflection sensor or strain sensor. The controller 24 calculates the friction device slip speed as the difference between the rotational speeds of the two rotating members. Typically, the friction device slip speed can be calculated based on speed measurements of other components within the powertrain. It is anticipated, however, that a speed sensor cluster 30 can generate rotational speed signals for the two members. The speed signals are then processed by the controller 24 to determine the friction device slip speed.

The controller 24 processes the friction device cooling control of the present invention. More particularly, the controller 24 uses a real-time thermal model of the friction device 16 to determine an appropriate fluid flow command ($F_k$). The real-time thermal model estimates one or more temperature states based on a heat rate ($H_R$) of the friction device 16. Operation of the flow control device 18 is based on $F_k$ to achieve a desired fluid flow. The friction device cooling control increases fluid flow as heat and/or estimated temperature increase to stabilize and/or limit peak values of the temperature. The thermal model implements one or more state variables to model the accumulation and dissipation of heat over time. Exemplary state variables include individual friction device component temperatures, bulk friction device temperature or thermal energies based on temperature. A more accurate temperature distribution through the friction device 16 can be achieved using additional state variables.

An exemplary thermal model using a single state variable, bulk friction device temperature ($T_C$), is provided according to the following equations:

$$T_{C\,deriv} = \left(\frac{1}{M_{frictiondevice}}\right)(H_R - K_{diss}(T_C - T_{sump}))$$

$$T_C = T_C + (\Delta t \cdot T_{Cderiv})$$

where:
$H_R$=heat rate (input)
$T_{sump}$=sump temperature (input)
$\Delta t$=loop time of the thermal model
$M_{friction\,device}$=approximate thermal inertia of the friction device system (J/°C)
$K_{diss}$=heat rejection of friction device and cooling system (W/°C)

The thermal model functions as a low-pass filter that tracks the value $$\frac{H_R}{K_{diss}} + T_{sump}$$

with a time constant equal to $$\frac{M_{frictiondevice}}{K_{diss}}.$$

Any similar low-pass filter function can be implemented to effectively perform as a thermal model.

Although the above-described thermal model uses only a single state variable ($T_C$), it can be appreciated that more complex thermal models can be implemented which incorporate multiple state variables. According to an exemplary embodiment, the controller 24 estimates the state variables using an estimator routine or multiple estimator routines. It is also anticipated, however, that the state variables can be directly measured using additional sensors.

The heat rate ($H_R$) is initially determined and is based on friction device torque and friction device slip speed. $H_R$ is processed in the thermal model to estimate the temperature state. As used here in, temperature state includes friction device temperatures or thermal energies. It is anticipated that the sump temperature and/or a feedback $F_k$ can be processed through the thermal model with $H_R$ to estimate the temperature state. $F_k$ is calculated based on the estimated temperature state. It is anticipated that $F_k$ can further be based on $H_R$ and/or the sump temperature.

A command signal based on $F_k$ is sent by the controller 24 to the flow control device 18. The controller 24 determines $F_k$ based on the thermal model results. $F_k$ is also based on the particular flow control device 18. For a simple on/off pump or valve, $F_k$ will be either on or off in the case of a pump or open/close in the case of a valve. For a variable rate pump or valve, $F_k$ will be an operational level. For example, $F_k$ will be an operational level from 0% to 100% for a variable capacity pump or valve. The flow control device 18 then operates based on $F_k$ to cool the friction device 16.

The thermal model coefficients can vary based on feedback such as $F_k$. For example, using the simple thermal model provided above, the coefficient $K_{diss}$ can vary based upon the current operational level of the flow control device 18. The controller 24 determines the value of the coefficients based on the feedback. This can be achieved using equations or look-up tables. In the interest of reducing processing complexity and time it is preferred that look-up tables are implemented. Again using the simple thermal model provided above, in the case of a simple on/off flow control device 18 $K_{diss}$ will have one value if the flow control device 18 is on and another value if off. In the case of a variable capacity flow control device 18 the value of $K_{diss}$ will vary based on the particular operational level (e.g., 0% to 100%).

Figure 2:
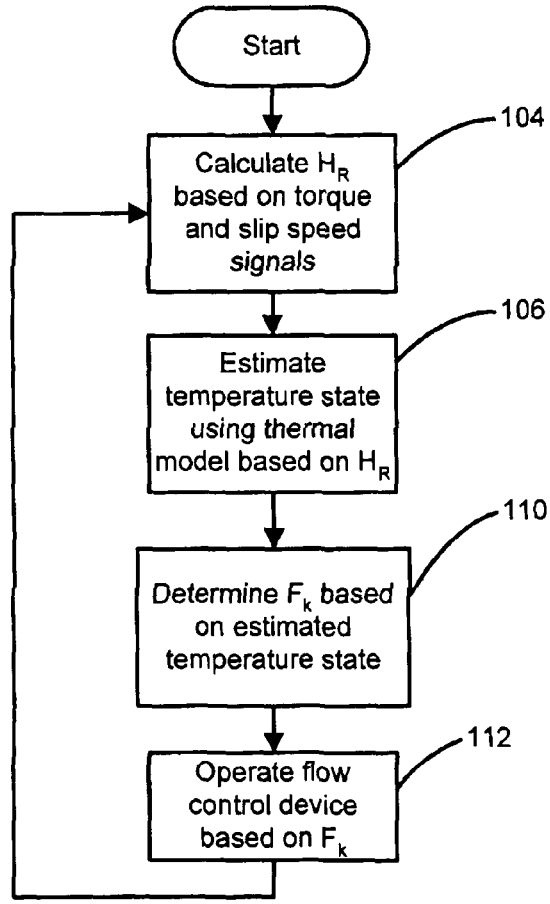
FIG. 2 is a flowchart illustrating the steps performed by the friction device cooling controller of the present invention.

Referring now to FIG. 2, the friction device cooling control of the present invention will be described. Control calculates a $H_R$ based on the friction device torque signal and friction device slip speed signal in step 104. In step 106, control estimates the friction device temperature state (temperatures or thermal energies) based on the $H_R$ using the thermal model. As discussed in detail above, it is also anticipated that the temperature state can be further based on sump temperature and/or a feedback $F_k$.

In step 110, control determines $F_k$ based on the estimated temperature state of the thermal model and the type of flow control device 18. As discussed in detail above, $F_k$ can be further based on $H_R$ and/or the sump temperature. In step 112, control operates the flow control device 18 based on $F_k$ to achieve the desired fluid flow rate. Control loops back to step 104. The friction device cooling control operates at constant intervals while the vehicle is operating to ensure adequate cooling control of the friction device 16.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

We claim:

1. A cooling system for cooling a friction device, comprising:
    a flow control device that controls a flow of cooling fluid through said friction device; and
    a controller configured to estimate at least one temperature state that includes a bulk friction device temperature of said friction device based on an estimated heat rate of said friction device,
    wherein said controller is configured to calculate a flow command based on said at least one temperature state and operates said flow control device based on said flow command,
    wherein said controller is configured to determine at least one of approximate thermal inertia of said friction device and heat rejection of at least one of said friction device and said cooling system, and
    wherein said controller is configured to estimate said at least one temperature state based on at least one of said approximate thermal inertia and said heat rejection.

2. The cooling system of claim 1, wherein said controller determines a friction device torque and a friction device slip speed and calculates said heat rate of said friction device based on said friction device torque and said friction device slip speed.

3. The cooling system of claim 1, further comprising:
    a sump for collecting said flow of fluid; and
    a sump temperature sensor that generates a sump temperature signal, wherein said at least one temperature state is further based on said sump temperature signal.

4. The cooling system of claim 1, wherein said at least one temperature state is further based on a current flow command.

5. The cooling system of claim 1, wherein said flow command is further based on said heat rate of said friction device and a sump temperature of said flow of fluid.

6. The cooling system of claim 1, wherein said at least one temperature state is a thermal energy of said friction device.

7. The cooling system of claim 1, wherein said temperature state is based on a loop time of a thermal model of said friction device.

8. The cooling system of claim 1, wherein said temperature state is based on a thermal module according to $$T_{C\,deriv} = \left(\frac{1}{M_{friction\,device}}\right)(H_R - K_{diss}(T_C - T_{sump})),$$

where $T_{Cderiv}$ is a derivative of said temperature state, $M_{friction\,device}$ is approximate thermal inertia of said friction device, $H_R$ is said heat rate, $K_{diss}$ is heat rejection of said friction device, $T_C$ is said temperature state and $T_{sump}$ is a sump temperature.

9. The cooling system of claim 1, wherein said controller determines said approximate thermal inertia and said heat rejection, and
    wherein said controller estimates said at least one temperature state based on said approximate thermal inertia and said heat rejection.

10. The cooling system of claim 9, wherein said approximate thermal inertia is in units of energy per units of temperature and said heat rejection is in units of power per units of temperature.

11. The cooling system of claim 1, wherein said friction device is a clutch of a transmission.

12. The cooling system of claim 11, wherein said controller is configured to determine heat rejection of said friction device.

13. A method of controlling cooling of a friction device, comprising:
    calculating a heat rate of said friction device;
    estimating a temperature state that includes a bulk temperature of said friction device based on said heat rate;
    determining a flow command based on said temperature state;
    determining a value based on the heat rate, heat rejection of said friction device, and sump temperature; and
    operating a flow control device based on said flow command to control a cooling fluid flow into said friction device,
    wherein said temperature state is estimated based on a thermal model of said friction device,
    wherein said thermal model performs as a low-pass filter, and
    wherein said low-pass-filter tracks said value.

14. The method of claim 13, further comprising:
    determining a friction device torque; and
    determining a friction device slip speed,
    wherein said heat rate is based on said friction device torque and said friction device slip speed.

15. The method of claim 13, wherein said value is equal to a sum of said sump temperature and said heat rate divided by said heat rejection.

16. The method of claim 13, comprising:
   determining said heat rate;
   determining said heat rejection;
   determining said sump temperature; and
   calculating said value based on said heat rate, said heat rejection, and said sump temperature.

17. A cooling system for cooling a friction device, comprising:
   a flow control device that controls a flow of cooling fluid through said friction device; and
   a controller that:
      estimates at least one temperature state that includes a bulk friction device temperature of said friction device based on an estimated heat rate of said friction device;
      calculates a flow command based on said at least one temperature state;
      operates said flow control device based on said flow command; and
      estimates said at least one temperature state based on at least one of an approximate thermal inertia of said friction device and heat rejection of at least one of said friction device and said cooling system,
   wherein said temperature state is based on a thermal model of said friction device,
   wherein said thermal model performs as a low-pass filter, and
   wherein said low-pass filter tracks $$\frac{H_R}{K_{diss}} + T_{sump},$$

where $H_R$ is said heat rate, $K_{diss}$ is heat rejection of said friction device, and $T_{sump}$ is a sump temperature.

18. The cooling system of claim 17, wherein said low-pass filter tracks $$\frac{H_R}{K_{diss}} + T_{sump}$$

with a time constant of $$\frac{M_{friction\ device}}{K_{diss}},$$

where $M_{friction\ device}$ is approximate thermal inertia of said friction device.

* * * * *